No. 834,117. PATENTED OCT. 23, 1906.
E. FRYSLIE.
DRAFT EQUALIZER.
APPLICATION FILED JAN. 22, 1906.

5 SHEETS—SHEET 1.

Witnesses:

Inventor:
Edward Fryslie
By Louis Bagger & Co.,
Attorneys

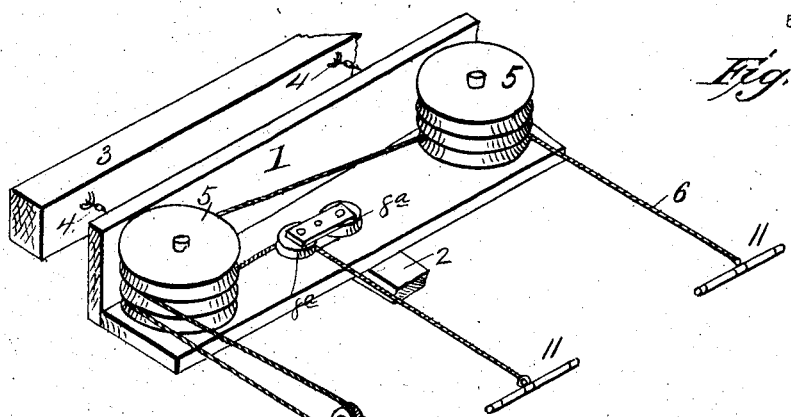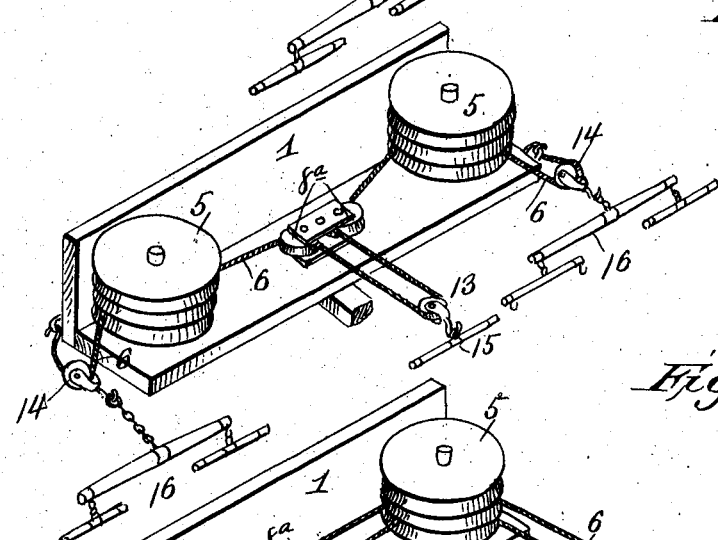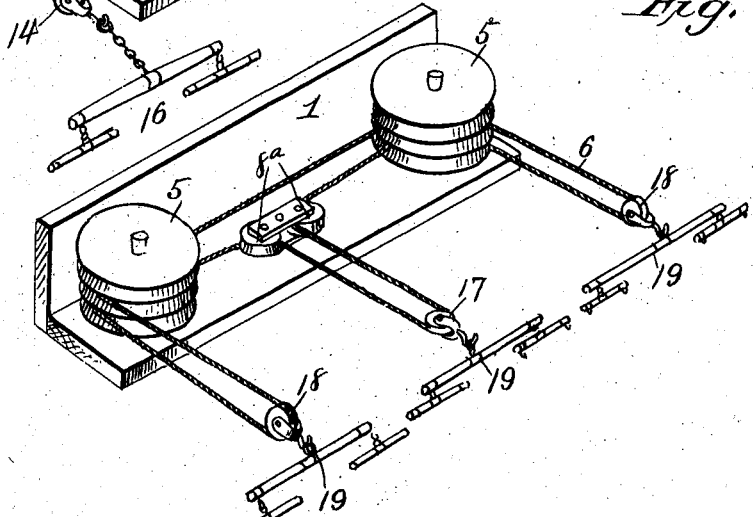

No. 834,117. PATENTED OCT. 23, 1906.
E. FRYSLIE.
DRAFT EQUALIZER.
APPLICATION FILED JAN. 22, 1906.
5 SHEETS—SHEET 3.
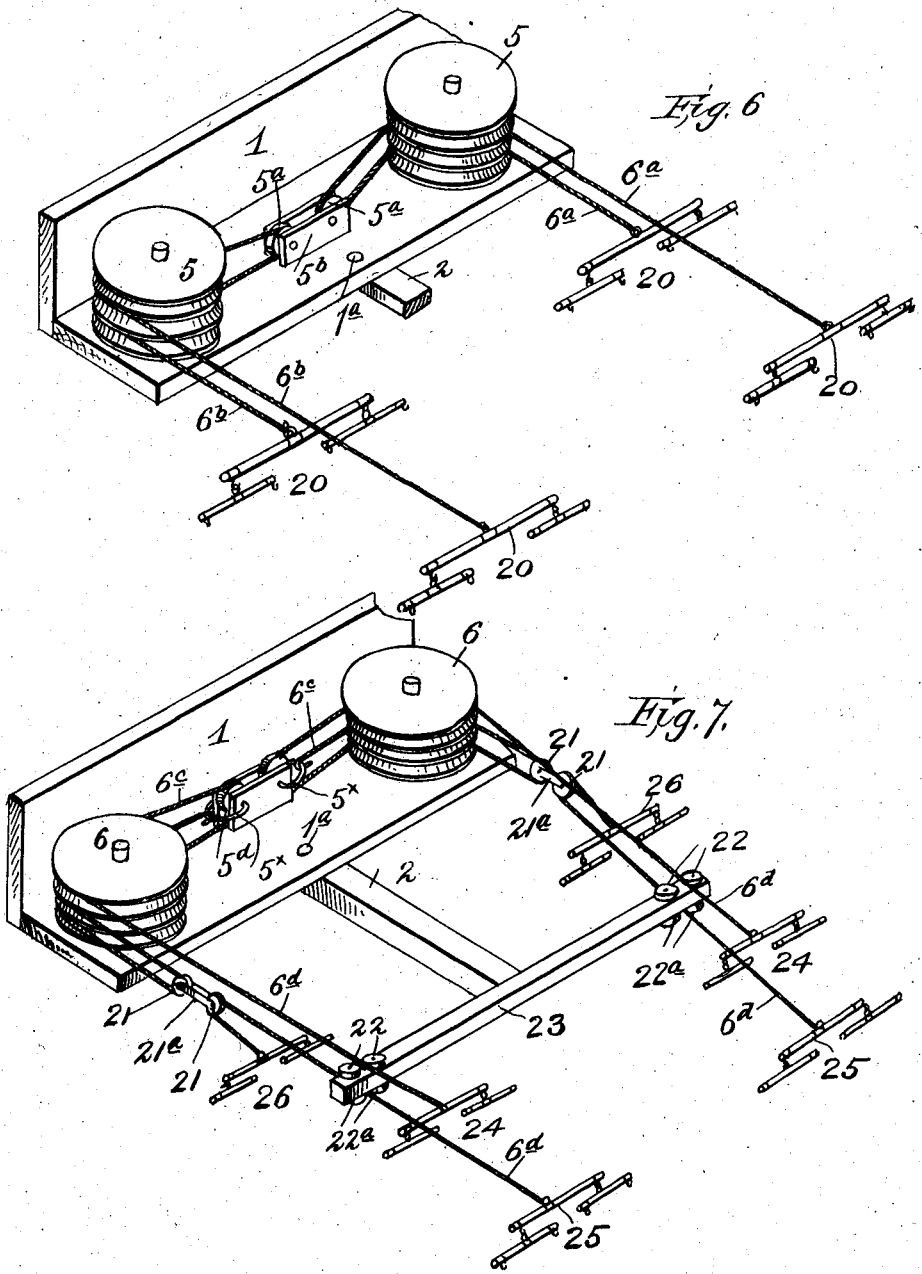
WITNESSES:
INVENTOR:
Edward Fryslie.
By
Attorneys No. 834,117. PATENTED OCT. 23, 1906.
E. FRYSLIE.
DRAFT EQUALIZER.
APPLICATION FILED JAN. 22, 1906.
5 SHEETS—SHEET 4.
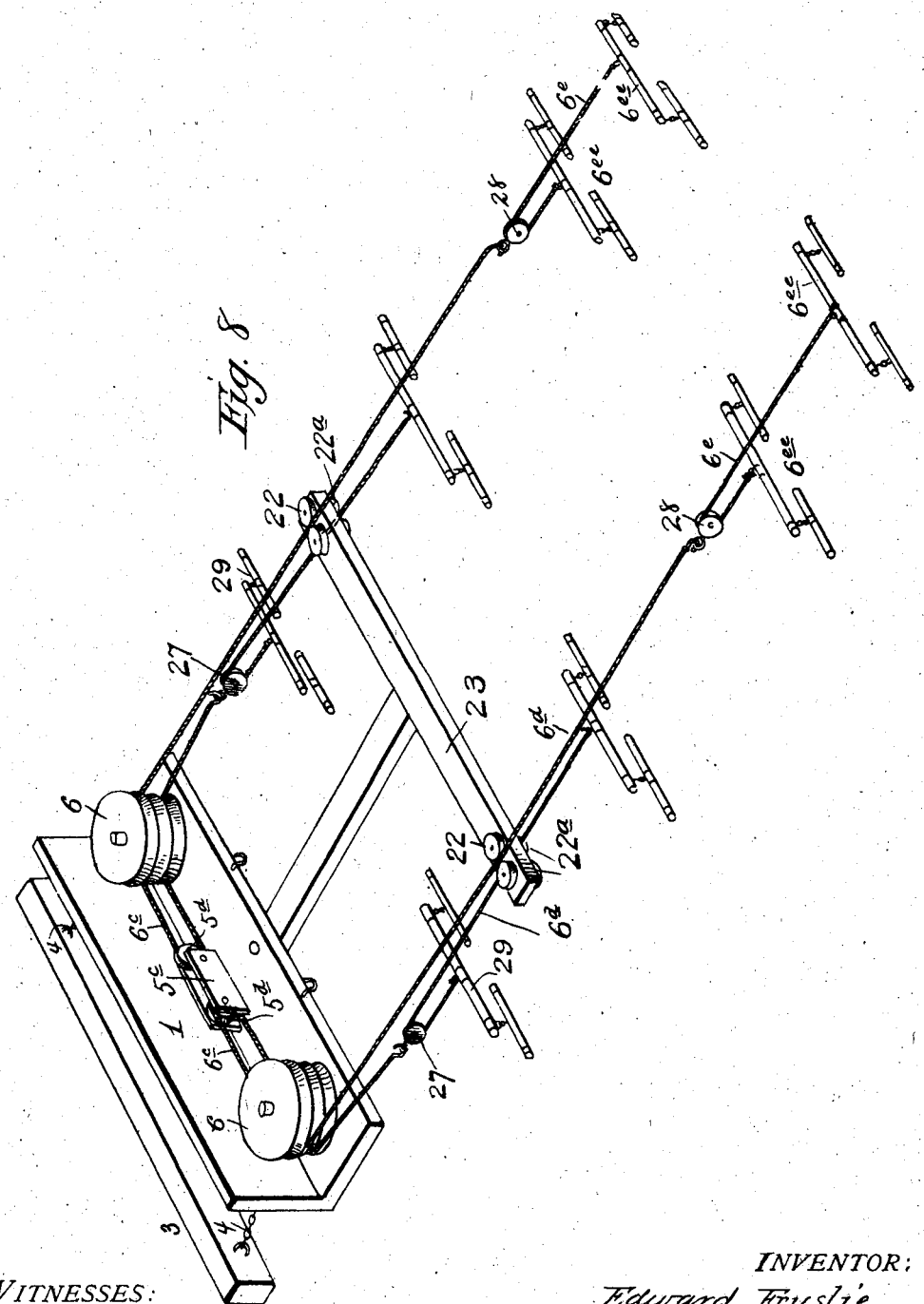
WITNESSES:
INVENTOR:
Edward Fryslie
By
Attorneys.

No. 834,117. PATENTED OCT. 23, 1906.
E. FRYSLIE.
DRAFT EQUALIZER.
APPLICATION FILED JAN. 22, 1906.
5 SHEETS—SHEET 5.
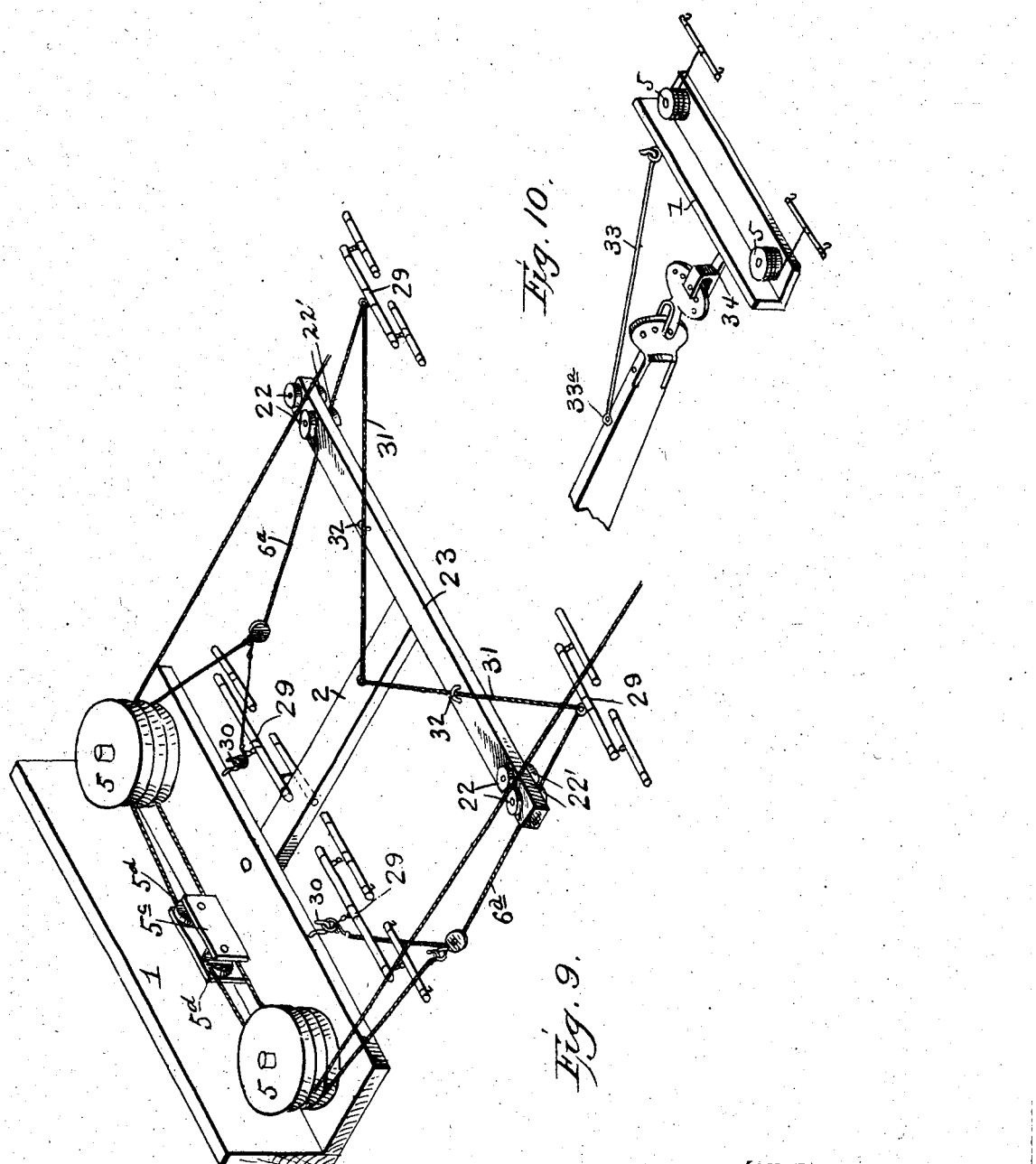
WITNESSES:
INVENTOR:
Edward Fryslie
By
Attorneys

UNITED STATES PATENT OFFICE.

EDWARD FRYSLIE, OF POPEJOY, IOWA, ASSIGNOR OF ONE-HALF TO JOHN H. CORCORAN, OF POPEJOY, IOWA.

DRAFT-EQUALIZER.

No. 834,117.     Specification of Letters Patent.     Patented Oct. 23, 1906.

Application filed January 22, 1906. Serial No. 297,293.

*To all whom it may concern:*

Be it known that I, EDWARD FRYSLIE, a citizen of the United States, residing at Popejoy, in the county of Franklin and State of Iowa, have invented certain new and useful Improvements in Draft-Equalizers, of which the following is a specification.

My invention relates to improvements in what are well known as "draft-equalizers." It has for its object, primarily, to dispense with the ordinary pivoted bar or lever arrangement or contrivance which is under the control or influence of the action of the tongue or draft-bar by initiating in lieu thereof means practically controlling the front axle and equipped to permit the equalizing of the draft independently of or from being influenced by the action or swaying of the draft-bar or pole, accruing greatly to the benefit or advantage of the movement of the horses or animals both in the ordinary pulling force or action and in an emergency, as when the vehicle-wheel meets an obstruction, preventing the tongue or pole pounding or injuring the horses.

Further objects of the invention are to accommodate the employment of sundry or plurality of teams hitched together or in common to a vehicle, an agricultural implement, as a plow and the like, a grading or ditching machine, and so on, for requisitely distributing or equalizing the pull or stress upon the individual animals or horses.

Said invention consists of certain features, substantially as hereinafter fully disclosed, and particularly pointed out by the claims.

Figure 1:
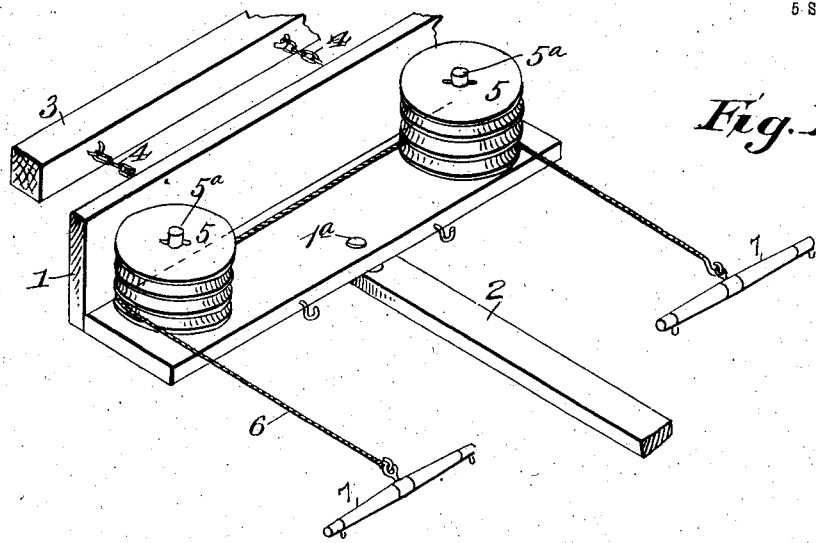
Figure 2:
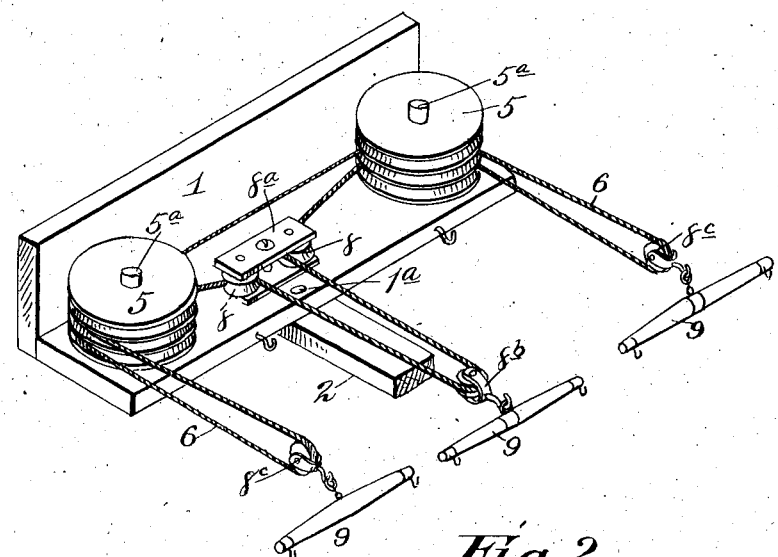

In the accompanying drawings, illustrating the preferred embodiment of my invention, Figure 1 is a broken perspective view of the initial disclosure thereof—as, for instance for a team of two horses. Fig. 2 is a like view showing the device adapted for three horses. Fig. 3 is a similar view showing it effective for the use of four horses. Fig. 4 is a like view disclosing it as contrived for five horses. Fig. 5 is also a like view showing it arranged for six horses. Fig. 6 is a similar view suggesting its use for eight horses. Fig. 7 is a like view showing it arranged for twelve horses. Fig. 8 is also a similar view suggestive of its use for sixteen horses. Fig. 9 is a corresponding view of the device, as arranged for twelve or sixteen horses, adapted or adjusted for convenience in turning. Fig. 10 is also a like view showing the initial form of the invention as applied for use in connection with a plow.

In carrying out my invention I provide a suitable support or bracket 1, mounted or supported upon the tongue or draft-bar 2 at or near its inner end, but not fixed to the latter, being retained thereon by a bolt $1^a$, passing loosely therethrough and held in place in the usual way. Said support or bracket is practically fixed to the axle 3 or the usual wooden portion or member thereof, being connected thereto laterally of the center by taut chain or link connections 4, securing or holding said bracket or support, as against being influenced by the action or partaking of the movement of the tongue or draft-bar, regardless of any sudden swaying or jerking action of the latter, as in the meeting or contacting of a front wheel with an obstacle, as a boulder, stone, and the like.

Two series of pulleys or sheaves 5, each preferably three in number and each having a common vertical axis $5^a$, positioned or fixed upon the horizontal member of the bracket or support 1 and suitably braced to the vertical member thereof, are arranged a suitable interval apart and engaged by or have passed in contact therewith a common chain or cable 6, of course in engagement with the lowermost two pulleys of said series. Said cable or chain is equipped with whiffletrees 7, in this instance each being a swingletree to accommodate two horses for draft-equalizing purposes. It will therefore be noted that by this arrangement with a horse or animal hitched to each swingletree the pulling force or action of the horses or animals irrespective of their drawing capacities will be mutually interchanged, and thus be equalized. Also it will be observed that as the draft or pulling action of the animals is exerted, through the medium aforesaid, practically upon the forward axle the forward wheels in event of their contact with an obstruction would be helped over or by such obstacle, and thus prove effective greatly in preventing a swaying or swinging action of the tongue, which would ordinarily be liable to pound or injure the horses. Further, it is noted that by this arrangement, since the draft is directly exerted upon the forward axle, the wrenching or swaying action which would be transmitted from the tongue or pole under the circumstances or conditions just indicated is wholly overcome, which would not be the case were the equalizing pulley-carrying bar or bracket under the action or influence of the tongue or pole, as is apparent.

In Fig. 2, for accommodating a team of three horses abreast, the cable or chain 6 is engaged with the two lower pulleys of the two series and threaded or passed into contact with two additional or independent pulleys 8, carried by a slide or block $8^a$, said chain or cable being intermediately looped or threaded through a block and tackle $8^b$ and again laterally through two additional blocks and tackle $8^c$, the latter being equipped with whiffletrees, in this case each being a swingletree 9.

In Fig. 3, for four horses abreast, the cable or chain 6 is passed around or engaged with the bottom pulley of one series and with the two lower pulleys of the opposite series and one of intermediate pulleys $8^a$ and threaded or looped through a block and tackle 10, said cable or chain having a swingletree 11 attached to each of its ends, while said block and tackle is equipped with a doubletree 12.

In Fig. 4, for five horses abreast, the cable or chain 6 is engaged with each of the bottom pulleys of the two series and with the intermediate pulleys $8^a$ and from these looped through a block and tackle 13, said chain or cable being further looped through two other or lateral blocks and tackle 14, their ends being suitably hooked to the rear edge of the bracket 1, near the rear corners thereof. Said blocks and tackle are equipped, the middle one with a swingletree 15 and the others with doubletrees 16.

In Fig. 5, for six horses abreast, the cable or chain 6 is engaged with the lower two pulleys of the two series and with the two intermediate pulleys $8^a$ and looped intermediately through a block and tackle 17 and laterally through two other blocks and tackle 18 18, the chain or cable having its ends united. Said blocks and tackle are each equipped with a doubletree 19.

In Fig. 6, for eight horses, two abreast, two cables or chains $6^a$ $6^b$ are engaged, one with the two lower pulleys of one pulley series and the other with the corresponding pulleys of the other pulley series and into engagement with two additional pulleys $5^a$, carried by a sliding "block" or support $5^b$, arranged intermediately of said pulley series, said cables or chains having attached to their respective ends doubletrees 20.

In Fig. 7, for twelve horses suitably hitched up, as indicated, chains or cables $6^c$ $6^d$ are suitably engaged with all three of the pulleys of the two series and suitably connected, as at $5^x$, with a sliding block $5^e$, carrying two pulleys $5^d$, with which latter said cables or lines are also engaged. Said cables or chains are also engaged with one each of four pulleys 21, each two being carried by a separate block $21^a$, each of said cables or chains being passed between pairs of pulleys 22, carried by a fixed cross-piece 23 of the tongue 2, answering practically to the ordinary neck-yoke, said chains or cables having attached to their outer or forward ends doubletrees 24. Two additional cables or chains $6^d$ are separately engaged with the other two pulleys 21 of the blocks $21^a$, and likewise pass between two other pulleys $22^a$, their respective ends having attached thereto doubletrees 25 and 26, respectively.

In Fig. 8, for sixteen horses suitably hitched up as designated, there are in addition to the chains or cables $6^c$ $6^d$ two other chains or cables $6^e$. The chains or cables $6^c$ $6^d$, however, are only engaged with the two lower pulleys of each of the two series, having been previously looped separately around the two pulleys $5^d$ of the sliding member $5^e$, one of the ends of each of the two chains $6^c$ $6^d$ being equipped, as shown, with a block and tackle 27. The other ends of these same cables or chains after having been passed between the pulleys 22 upon the member 23 are also equipped with blocks and tackle 28, and through these latter are passed the additional chains or cables $6^e$, which are provided at their respective ends with doubletrees $6^{ee}$. The cables or chains $6^d$, as in Fig. 7, are between the pulleys $22^a$, but in this example are passed through the pulley-blocks 27 and provided at their respective ends with doubletrees 29.

In Fig. 9 is shown practically the twelve or sixteen horse form of the equalizer partially dismantled or parts removed and with those parts shown as adjusted for facility in turning the vehicle. In other words four of the teams of two horses each are unhitched and the whiffletrees 29 of the cables or chains $6^d$ hung upon hooks 30, projecting from the member 1, while the forward whiffletrees 29 of the same cables or chains are suspended from additional chains 31, passed through staples 32 upon the cross-piece 23 and secured, preferably, to the tongue or pole 2. Of course after turning the vehicle the original or normal condition is restored, as will be readily understood.

In Fig. 10, showing the principle of applying the device for use in connection with a plow, a rod 33, pivoted to the plow-beam, as at $33^a$, is suitably hooked or otherwise detachably connected to the rear side of the member 1, near one end, while a clevis connection 34 is effected between the forward end of said beam and the same side of said member near its opposite end.

I claim—

1. A draft-equalizer comprising a bracket equipped with opposite spaced-apart pulleys one at each end, means for securing said bracket in a fixed relation or position independent of the tongue or draft-bar and close to the point of attachment of the latter, and a draft-applying means controlled in its movement by engagement with said pulleys and itself effective for controlling two teams, one team at each end.

2. A draft-equalizer, comprising a bracket equipped with oppositely-spaced-apart pulleys one at each end, means for securing said bracket in a fixed relation or position independent of the tongue or draft-bar and close to the point of attachment of the latter, and a draft-chain controlled in its movement by engagement with said pulleys and itself effective for controlling two teams, one at each end, beyond each pulley.

3. A draft-equalizer, having two opposed series of pulleys, means for supporting the latter, means for effecting fixed connection therebetween and the forward vehicle-axle, a forward tongue-carried cross-bar equipped with opposite pairs of pulleys, and cables or chains engaging the aforesaid series of pulleys and pulleys arranged in a sliding block or carrier and the pulleys of said cross-bar, said chains or cables also being equipped with means for the attachment thereto of a plurality of teams.

4. A draft-equalizer having a bracket or support suitably arranged upon the draft-pole or tongue and equipped with two opposed series of pulleys, a cross-bar secured to said tongue and furnished with pulleys, chains or cables effecting engagement with said pulleys and looped around additional pulleys supported in a sliding block, and equipped with team-hitching means, and additional chains or means adapted to suspend in position said cables with said team-hitching means, said cable also adapted to be temporarily held in inoperative position as set forth.

In testimony whereof I have signed my name to this specification in the presence of two subscribing witnesses.

EDWARD FRYSLIE.

Witnesses:
R. V. MENDELL,
E. E. ROMAINE.